US012661926B2

(12) United States Patent
Torres

(10) Patent No.: US 12,661,926 B2
(45) Date of Patent: Jun. 23, 2026

(54) PAINT CARRIER TRAY AND CADDY

(71) Applicant: Rene Contreras Torres, Saginaw, MI (US)

(72) Inventor: Rene Contreras Torres, Saginaw, MI (US)

( * ) Notice: Subject to any disclaimer, the term of this patent is extended or adjusted under 35 U.S.C. 154(b) by 31 days.

(21) Appl. No.: 18/399,868

(22) Filed: Dec. 29, 2023

(65) Prior Publication Data

US 2025/0214367 A1 Jul. 3, 2025

(51) Int. Cl.
*B44D 3/12* (2006.01)
*B44D 3/14* (2006.01)

(52) U.S. Cl.
CPC ............. *B44D 3/123* (2013.01); *B44D 3/126* (2013.01); *B44D 3/14* (2013.01)

(58) Field of Classification Search
CPC ........ B44D 3/128; B44D 3/123; B44D 3/126; B44D 3/12; B44D 3/125; B44D 3/121; B44D 3/14; B65D 23/003; B65D 25/22
USPC ....... 220/700, 699, 697, 696, 695, 570, 751; 15/236.03
See application file for complete search history.

(56) References Cited

U.S. PATENT DOCUMENTS 3,837,034 A 9/1974 Leffert et al.
4,491,234 A * 1/1985 Wilcock ................ B44D 3/121 401/121
4,938,355 A 7/1990 Rocco
5,207,348 A * 5/1993 Fischer .................. B44D 3/123 220/700
5,489,051 A * 2/1996 Robinson ................ A45F 5/021 220/570
5,509,169 A * 4/1996 Drucker ................. B44D 3/126 D32/53.1
5,511,279 A * 4/1996 Ippolito ................. B44D 3/126 220/570
5,735,399 A * 4/1998 Ste. Marie ............ B44D 3/126 220/555
7,527,164 B1 * 5/2009 Reichborn ............... B44D 3/14 220/570
7,537,111 B2 5/2009 Hart et al.
8,003,362 B2 8/2011 Wagner et al.
8,162,275 B2 4/2012 Reusser
8,887,940 B2 11/2014 Kiceniuk, Jr. et al.
9,440,485 B2 9/2016 Krusoe
D783,218 S 4/2017 Thibault
2002/0096527 A1 * 7/2002 Arenas ................... B44D 3/121 220/570
2009/0277913 A1 * 11/2009 Bergman ............... B44D 3/126 220/570
2009/0283361 A1 11/2009 Gibson et al.
2012/0061399 A1 * 3/2012 Pohl ....................... B44D 3/126 220/570
2022/0258529 A1 8/2022 Alvarez
(Continued)

*Primary Examiner* — Robert J Hicks

(57) ABSTRACT

A paint carrier and caddy, the paint carrier and caddy comprising a carrier tray, wherein the carrier tray is of unitary construction. The unitary tray has an inside bottom surface. There are also contained on the bottom surface, raised partitions, the raised partitions being at least one-half inch in height. There is a kit comprising a paint carrier and caddy and a can with paint contained therein, a paint roller pan, at least one paintbrush, a long-handled paint roller, a short-handled paint roller, or any combination of the above.

18 Claims, 5 Drawing Sheets

(56) References Cited

U.S. PATENT DOCUMENTS

| | | | | |
|---|---|---|---|---|
| 2023/0241911 | A1 | 8/2023 | Torres | |
| 2024/0253390 | A1 * | 8/2024 | Torres | B44D 3/123 |

* cited by examiner

PAINT CARRIER TRAY AND CADDY

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

It is well-known to those skilled in the art that painting is a messy business. Ordinarily, painters have a plurality of brushes wet with paint in order to cover flat walls, ceilings, corners, edges, and the like without having to resort to going to some other storage to retrieve such items.

It would be convenient for painters to be able have all of the necessary equipment right at hand as they are in a painting project. Also, it would be convenient if the various wet paint containing tools of the trade were supported within a carrier tray. Thus, there are a number of cases, tools, and the like, in the commercial sector for them to utilize.

One such carry case can be found in U.S. Pat. No. 4,938,355 that issued Jul. 3, 1990, to Rocco in which a carrying case is disclosed that allows for carrying many tools. The uniqueness of the device is the recesses in the inside tool tray that are provided.

A painter's caddy is disclosed in U.S. Pat. No. 3,837,034 that issued Sep. 24, 1974, to Leffert et al in which there is disclosed a painter's utensil tray or paint rollers.

Disclosed in U.S. Pat. No. 7,537,111 that issued on May 26, 2009, to Hart et al is a process of sealing open paint trays, paint cans, and wet brushes.

U.S. Patent publication 2009/0283361 that published on Nov. 19, 2009, in the name of Donald Gibson deals with a designed ladder top to accommodate tools.

Cull, in U.S. Pat. No. 8,003,362 that issued Oct. 11, 2011, discloses a caddy apparatus in conjunction with a ladder.

Disclosed in U.S. Pat. No. 8,162,275 issued on Apr. 24, 2012, to Reusser deals with an attachment to a ladder for supporting paint cans.

Kiceniuk, Jr., et al in U.S. Pat. No. 8,887,940 that issued Nov. 18, 2014, deals with a container designed to hold tools.

U.S. Pat. No. 9,440,485 that issued to Krusoe on Sep. 13, 2016, deals with a paint caddy that supports a paint bucket on a shaft for transferring paint from the bucket to a paint pan.

Richard Thibault in U.S. design Pat. No. 783,218 S that issued on Apr. 4, 2017, discloses a wheeled caddy that is remotely similar to a mop bucket on wheels.

Alvarez in U.S. Patent publication 2022/0258529 that published on Aug. 18, 2022, deals with a bar and magnet assembly for removing excess paint from a brush.

Torres, in U.S. Publication 2023/0241911 that published on Aug. 3, 2023, discloses a holder for paint brushes that attaches to a paint roller pan.

BRIEF SUMMARY OF THE INVENTION

Thus, what is disclosed and claimed herein is a paint carrier and caddy, the paint carrier and caddy comprising a carrier tray, wherein the carrier tray is of unitary construction.

The unitary tray has an inside bottom surface. There are also contained on the bottom surface, raised partitions, the raised partitions being at least one-half inch in height.

The carrier tray has a first side, a second side, a front end and a back end wherein the first side has a plurality of first notches therein to support handles of paint brushes.

The front side has a second notch in it for supporting a handle of a paint roller. The front end has an edge, and the edge contains an opening through it for allowing one to hang the tray on a hook or the like. The carrier tray contains a paint can support on the inside bottom surface.

Also considered an embodiment in this invention is a kit comprising a paint carrier and caddy as set forth just supra and a can with paint contained therein, a paint roller pan, at least one paintbrush, a long-handled paint roller, a short-handled paint roller, or any combination of the above.

BRIEF DESCRIPTION OF THE SEVERAL VIEWS OF THE DRAWING(S)

DETAILED DESCRIPTION OF THE INVENTION

Thus, what is disclosed and claimed herein is a paint carrier and caddy that is useful for professional painters as well as the home body do-it-yourselfers. The caddy provides a means by which the paint project can be essentially stain and smear free by virtue of the containment by the caddy of the utensils and tools that are used with the wet paint.

Figure 1:
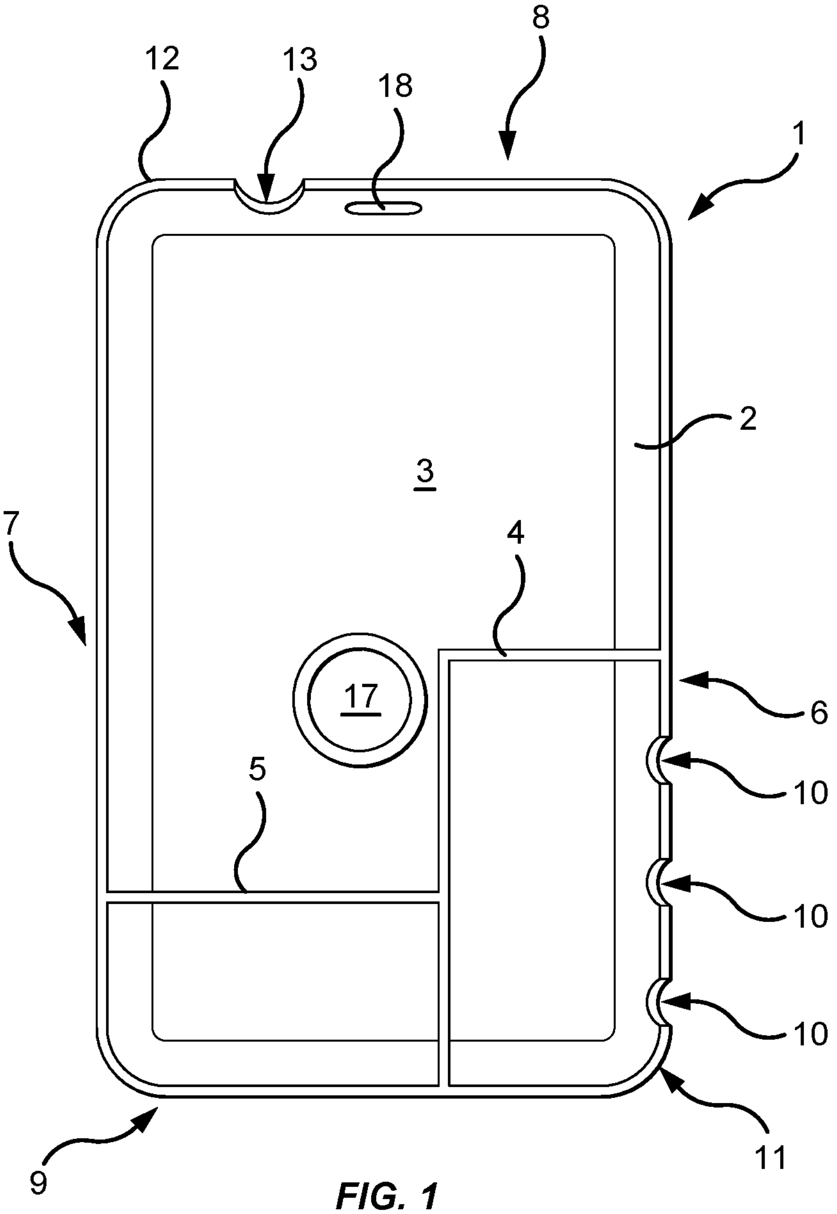
FIG. 1 is a full top view of the invention.

Turning now to FIG. 1, there is shown a full top view of a carrier and caddy 1 of this invention. There is shown the tray 2 which holds the various components for the painter. The tray 2 is manufactured with a unitary structure, although that is not necessary. The tray 2 is configured such that there is a bottom inside surface 3. There are two raised partitions 4 and 5 and these partitions should be at least one-half inch in height.

There is a first side 6, a second side 7, a front end 8, and a back end 9. The first side 6 has at least one notch 10 in a top edge 11 although there is shown typically three such notches 10 owing to the number of brushes 16 that painters generally use.

The front end 8 has a front edge 12 and the front edge 12 has a notch 13 that holds the handle 14 of a long-handled paint roller 15.

Near raised partition 4 is located a grooved, flat, paint can holder 17 that is affixed to the bottom surface 3. This device is for holding gallon size paint cans (not shown) such that they will not tip over during movement of the tray 2, but it is contemplated within the scope of this invention to utilize smaller sized paint cans on this device. There is located in the front end 8, an opening 18 for attachment of a handle (not shown) or for a device to move the tray 2, such as a rod or leash (not shown).

Tray 2 is manufactured such that preferably, the outside top edge is rolled such that there are no sharp edges and the tray 2 can be lifted by such edges.

The tray is preferably manufactured from plastics or metals. Metals preferred are light weight steel and aluminum. Preferred plastics are vinyl, urethane, polyethylene, polypropylene, and cross-linked polyethylene. Most preferred plastics are polyethylene and cross-linked polyethylene.

Figure 2:
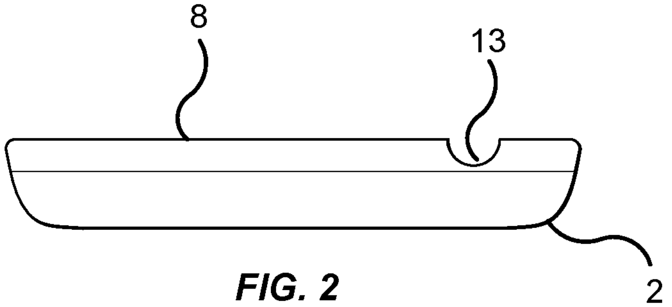
FIG. 2 is a full end view of the front end of the invention.

FIG. 2 is a full front-end view of the tray 2 showing the notch 12 that is used for the long handle of the long-handled paint roller and the front edge 8.

Figure 3:
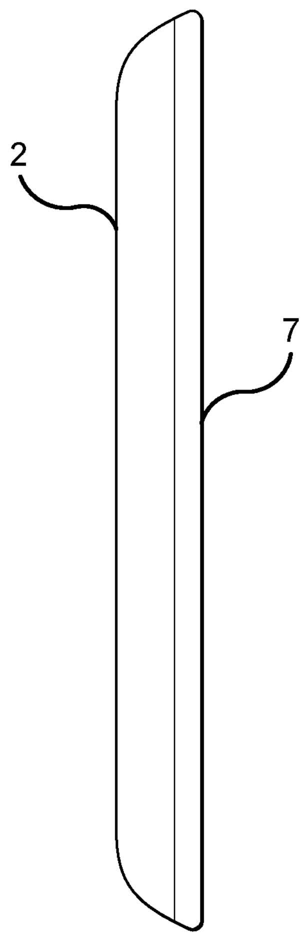
FIG. 3 is a full side view of the second side of the invention.
Figure 4:
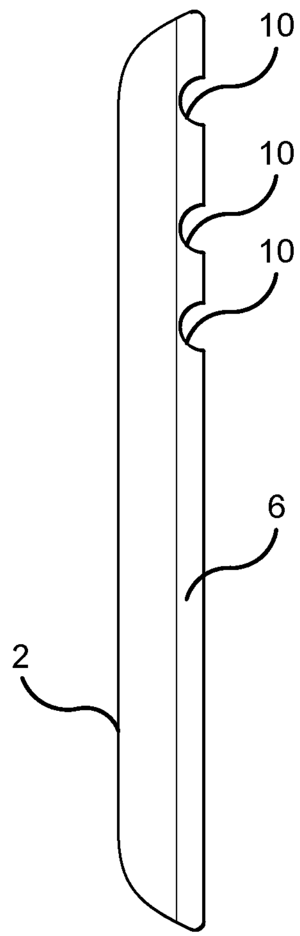
FIG. 4 is a full side view of the first side of the invention.

Turning now to FIGS. 3 and 4 wherein FIG. 3 is a full second side of the tray 2, there is shown the tray 2 and the edge 6. FIG. 4 shows the full first side of the tray 2 and the notches 10 along with the top edge 6.

Figure 5:
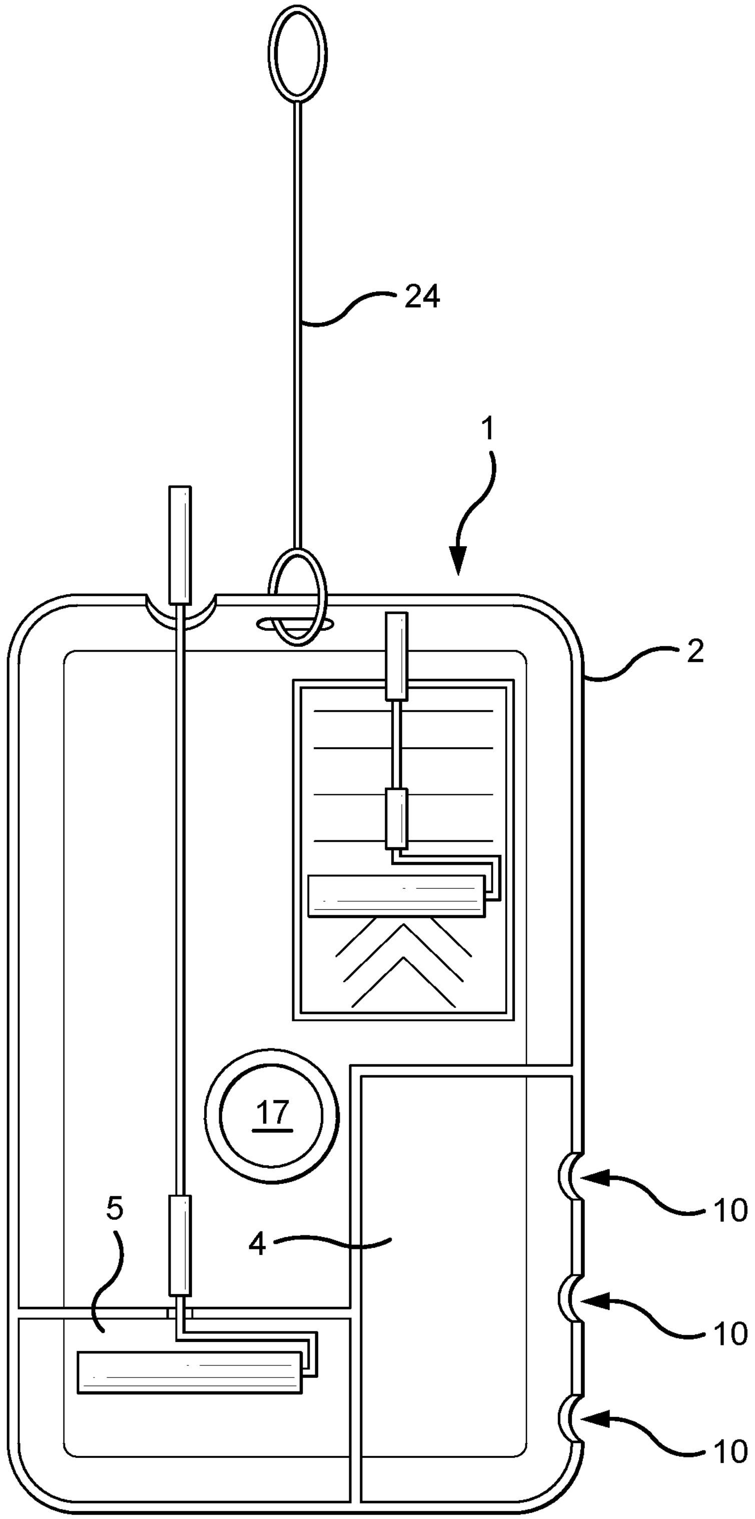
FIG. 5 is a full top view of the tray with a long-handled paint roller assembly, a roller paint pan and a short-handled paint roller.
Figure 6:
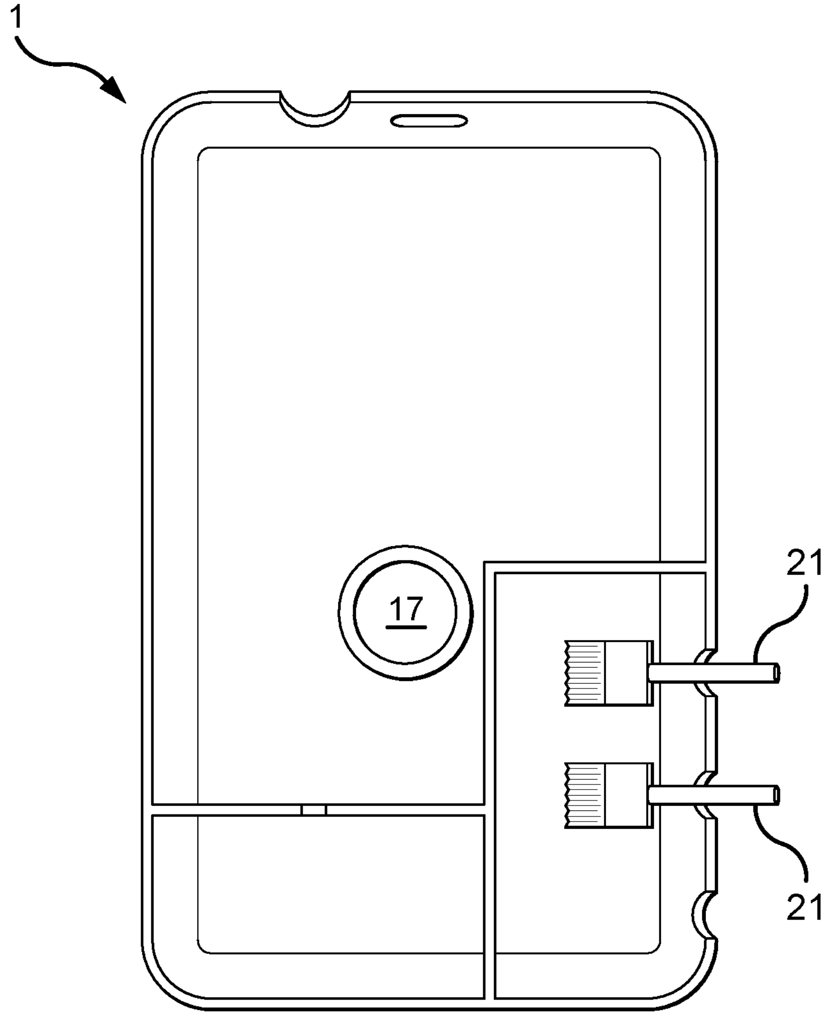
FIG. 6 is a full top view of the tray with two paint brushes located in it.

Turning now to FIG. 5, there is shown a full top view of the device 1 wherein there is also shown a long-handled paint roller 19, a short-handled paint roller 20, in a paint roller pan 22. FIG. 6 shows a full top view of the device 1 of this invention containing two paint brushes 21 in place.

Figure 7:
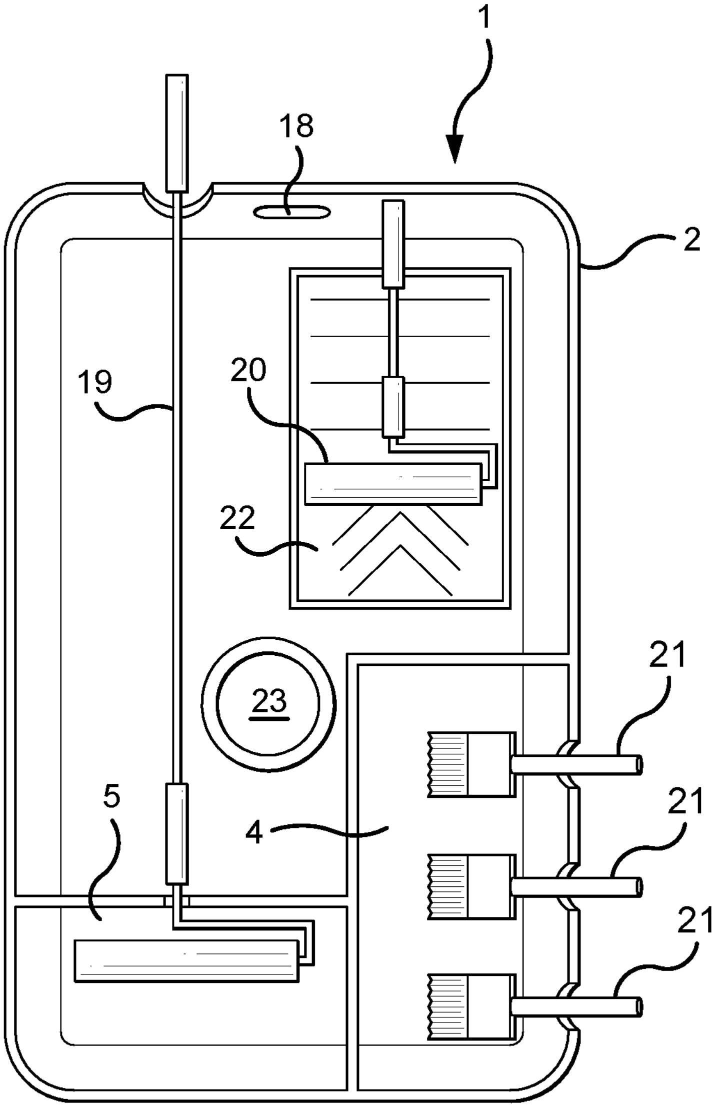
FIG. 7 is a full top view of the tray with a full complement of paint equipment.

FIG. 7 is a full top view of the device 1 of this invention with a complement of useful tools, such as a short-handled paint roller 20 in a paint roller pan 22, three brushes 21, a long-handled paint roller 19, a can of paint 23, and a pulling leash 24 (see FIG. 5).

What is claimed is:

1. A paint carrier and caddy, said paint carrier and caddy comprising: a carrier tray, said carrier tray being of unitary construction, said unitary tray having an inside bottom surface, there being contained on said bottom surface, raised partitions, said raised partitions being at least one-half inch in height;

said carrier tray having a first side, a second side, a front end and a back end;

said first side having a plurality of first notches therein to support handles of paint brushes;

said front side having a second notch therein for supporting a handle of a paint roller;

said front end having an edge and said edge containing an opening therethrough;

said carrier tray containing a paint can support on said inside bottom surface.

2. The paint carrier and caddy as claimed in claim 1 wherein said carrier tray is 20 to 28 inches wide, 30 to 38 inches long and 2 to 4 inches deep.

3. The paint carrier and caddy as claimed in claim 1 wherein said carrier tray is manufactured from plastic.

4. The paint carrier and caddy as claimed in claim 3 wherein said plastic is polyethylene.

5. The paint carrier and caddy as claimed in claim 3 wherein said plastic is polypropylene.

6. The paint carrier and caddy as claimed in claim 3 wherein said plastic is vinyl.

7. The paint carrier and caddy as claimed in claim 1 wherein said carrier tray is manufactured from metal.

8. The paint carrier and caddy as claimed in claim 3 wherein said plastic is crosslinked polyethylene.

9. The paint carrier and caddy as claimed in claim 3 wherein said pliastic is urethane.

10. The carrier and caddy as claimed in claim 7 wherein the metal is aluminum.

11. The carrier and caddy as claimed in claim 7 wherein the metal is steel.

12. The paint carrier and caddy as claimed in claim 1 wherein the carrier tray has a carrying handle.

13. In combination, a kit, comprising a paint carrier and caddy as claimed in claim 1 and a paint can sitting on said paint can support.

14. In combination, a kit, comprising a paint carrier and caddy as claimed in claim 1 and a paint roller pan.

15. In combination, a kit, comprising a paint carrier and caddy as claimed in claim 1 and at least one paintbrush.

16. In combination, a kit, comprising a paint carrier and caddy as claimed in claim 1 and a long-handled paint roller.

17. In combination, a kit, comprising a paint carrier and caddy as claimed in claim 1 and a short-handled paint roller.

18. In combination, a kit, comprising a paint carrier and caddy as claimed in claim 1 and i) a can with paint contained therein,
ii) a paint roller pan,
iii) at least one paintbrush,
iv) a long-handled paint roller,
v) a short-handled paint roller, or
vi) any combination of i)-v).

* * * * *